Oct. 25, 1949.  L. K. HYDE  2,485,735
DEFLECTOMETER
Filed Nov. 17, 1945  2 Sheets-Sheet 1

INVENTOR
Lawrence K. Hyde
BY

Oct. 25, 1949. L. K. HYDE 2,485,735
DEFLECTOMETER
Filed Nov. 17, 1945 2 Sheets-Sheet 2
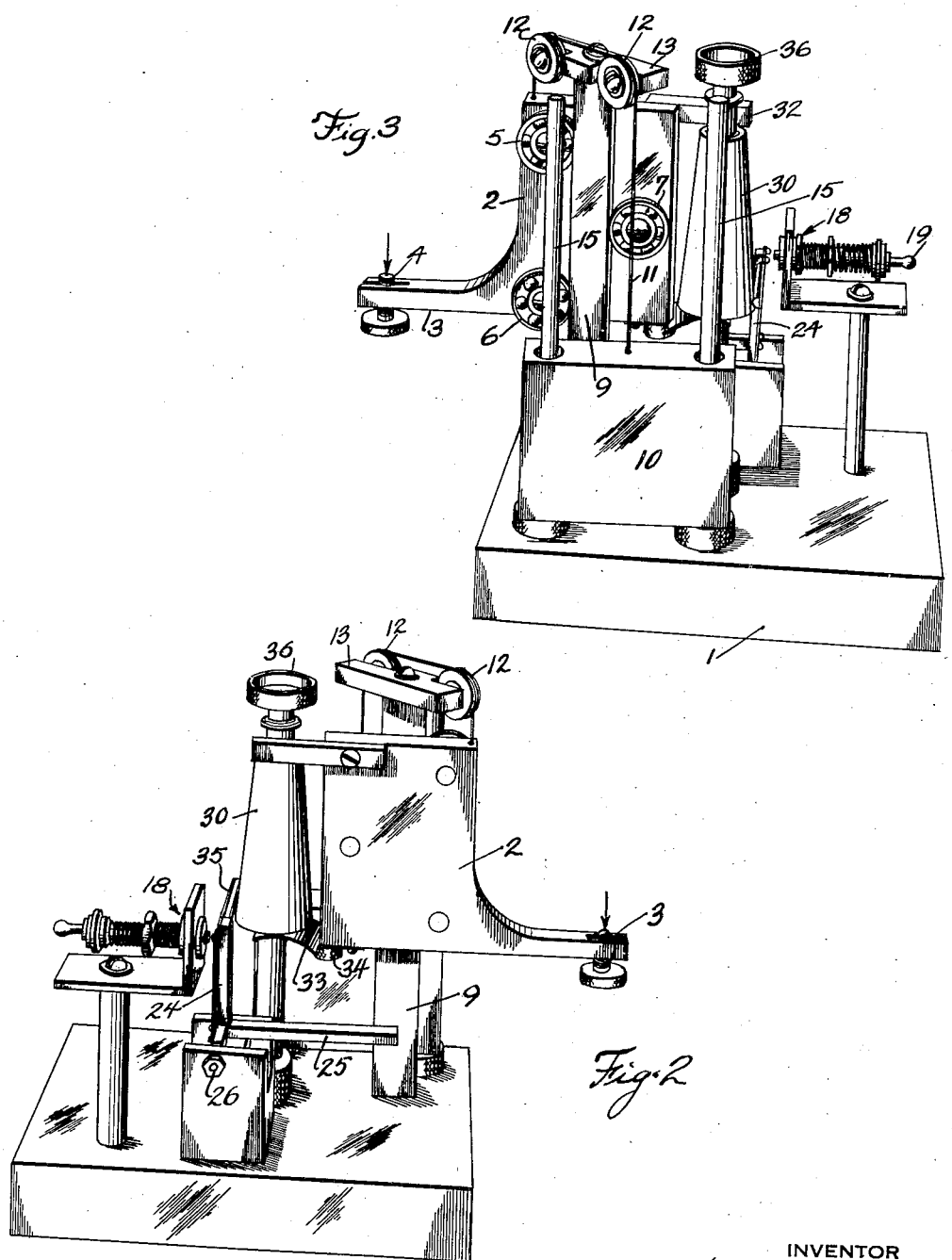
INVENTOR
Lawrence K. Hyde
BY Patented Oct. 25, 1949

2,485,735

UNITED STATES PATENT OFFICE 2,485,735

DEFLECTOMETER

Lawrence K. Hyde, Washington, D. C., assignor to The Baldwin Locomotive Works, a corporation of Pennsylvania Application November 17, 1945, Serial No. 629,246

3 Claims. (Cl. 33—169)

This invention relates generally to deflectometers for materials testing and more particularly to a deflectometer having different degrees of magnification and appropriate measuring ranges for the various degrees of magnification.

Various types of deflectometers have heretofore been proposed and used for obtaining a magnification of the extent of deflection of a specimen under test whereby an enlarged autographic record of the deflection may be effectively made, but these prior devices have been deficient in various functional or structural aspects particularly as to their flexibility of use and ease of changing from one degree of magnification to another. For instance, in testing plastics the range of deflection may, for example, extend from one and one-half inches in a 16" specimen to only a few thousandths of an inch in a 1" specimen. In the first instance a small magnification is required and in the second a large magnification.

It is an object of my invention to provide an improved deflectometer adapted to produce a plurality of magnifications which can be conveniently and expeditiously selected and which is relatively economical in construction and maintenance combined with a high degree of sensitivity, accuracy and compactness.

Other objects and advantages will be more apparent to those skilled in the art from the following description of the accompanying drawings in which:

Fig. 2 is a perspective of the deflectometer shown in position for low magnification, this perspective being viewed from the same side as Fig. 1; and Fig. 3 is perspective of Fig. 2 viewed from the opposite side thereof to show the counterbalancing weight and the guiding arrangement for the specimen contacting movable element.

Figure 1:
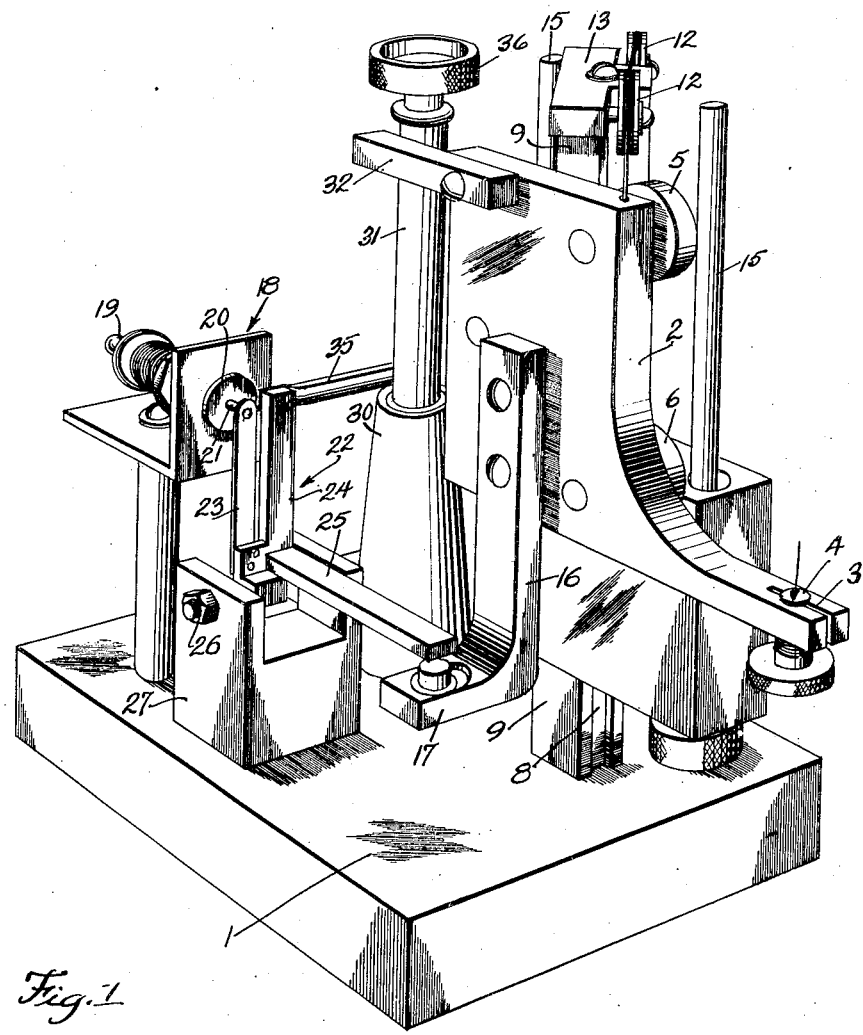
Fig. 1 is a perspective showing the deflectometer arranged for high magnification.

My improved device comprises a base 1 having a vertically movable crosshead 2 with a lateral arm 3 which is provided with an adjustable screw 4 for contacting a specimen or other element whose movement is to be measured. In the case of a transverse test, where a specimen is horizontally supported upon two fulcra and load is applied at the middle, the lateral arm 3 is placed beneath the specimen with contact 4 in abutting engagement therewith, it being understood that the base 1 is placed on the usual testing machine platen and is of sufficient weight to remain in position thereon. The crosshead 2 is provided with a plurality of rollers 5, 6 and 7, Fig. 3, disposed in grooves such as 8, Fig. 1, on opposite sides of a vertical guide post 9. The weight of crosshead 2 is counterbalanced so that it is normally biased upwardly by a counterweight 10, Fig. 3, connected by a thread 11 of any suitable material running over guide sheaves 12 which are suitably supported on a cross piece 13. The cross piece is secured to the upper end of post 9 at an angle thereto so that the single thread 11 can be directly connected to the crosshead and to the weight in the manner shown. The counterbalance is provided with vertical openings to freely receive vertical guide posts 15 secured in base 1.

For high magnification an extension 16 is removably secured to crosshead 2 and has a horizontal arm 17 adapted to operate a responsive means forming one element of a well-known electrical telemetric system hereafter referred to. The responsive means is specifically shown herein, for the purpose of illustration, as an electrical contact device generally indicated at 18. This device is associated with a universal joint 19 for connection to an autographic recorder of the general type shown, for example, in the telemetric system of Templin Patent No. 2,091,534 and hence no further disclosure of the recording mechanism is necessary. It will suffice to state that the electrical contact device includes a rotatable threaded electrical contact 20 adapted to move in or out upon rotation to provide a follow-up action in closing or opening a cooperating contact 21 which specifically is the motion responsive element of the responsive means. Such element is formed as an integral part of a bell crank generally indicated at 22 and consisting of a relatively flexible arm 23 for supporting contact 21 and two rigid arms 24 and 25 pivotally supported as at 26 in a block 27 secured to base 1. Arm 25 is of sufficient length and weight so that it is biased in a clockwise direction for engagement with crosshead arm 17 thereby to follow the same during downward movement caused by deflection of a specimen pushing downwardly on lateral arm 3. As contacts 20 and 21 are separated by downward movement of arm 25 the rotatable follow-up action of member 19 re-establishes the contact. As disclosed in said Templin patent, the foregoing causes operation of the recording mechanism. It will, of course, be understood that where reference is made to an electrical contact follow-up system, it is within the scope of the present invention to have arm 23 operate any other usual type of follow-up control system which may be of the magnetic, air jet or other type. In any event, it is seen that, by reason of the direct inter-position of the bell crank, small vertical movements of lateral arm 3 will allow a high magnification of the follow-up movement of contact 20.

To obtain a large measuring range, of the order of two inches, with corresponding low magnification, the extension 16 is removed from crosshead 2 and a magnifying cone 30 is then lifted from its idle position shown in Fig. 1 and secured to the crosshead to move therewith. This cone is vertically slidable on a guide post 31 secured to base 1 and is adapted to have its upper end held against a horizontal extension 32 of crosshead 2 while the lower end of the cone, as shown in Fig. 2, is engaged by a spring clip 33 secured to the underside of crosshead 2 by any suitable screw 34 which can be released to allow spring 33 to be removed and the cone dropped to its position when high magnification is employed. As shown in Fig. 2, the cone 30 will move up and down with crosshead 2 in accordance with movement imparted thereto by deflection of a specimen acting on arm 3. To bring electrical contact 20 into cooperative relation with cone 30 there is provided as shown in Fig. 1 a lateral extension 35 on bell crank arm 24. The arm 35 rests against the surface of cone 30 so as to be moved in proportion to the magnifying angle of flare of the cone and the axial distance the cone is moved by the specimen. Cones of any desired magnification angle may be employed simply by removing a keeper nut 36 from post 31 and substituting cones of desired taper. For simplicity, the post 31 and the bore through cone 30 are cylindrical so that the cone 30 is not required to have any fixed angular position on its post.

From the foregoing disclosure, it is seen that I have provided a relatively simple and compact deflectometer having a plurality of magnifications which are readily selectable by utilizing a plurality of elements common to various range selector devices such as arm 16 and cone 30. These devices are selectively connectable to one of the common elements such as crosshead 2 for actuation thereby while at the same time the selected device is brought into an operative connection with the other common element such as the follow-up control 22. Thus it is seen that the actuating crosshead 2 as well as the actuated bell crank 22 are both functionally related to the intermediate elements such as cone 30 and low magnification arm 16. This is conducive to maximum simplicity with a high degree of selectivity together with ease and uniformity of application to various sizes of specimens as well as many other advantages herein pointed out or inherent in the combination of elements constituting my invention.

It will of course be understood that various changes in details of construction and arrangement of parts may be made by those skilled in the art without departing from the spirit of the invention as set forth in the appended claims.

I claim:

1. A deflectometer comprising, in combination, a vertically movable substantially counter-balanced crosshead adapted to be engaged by and have its movement controlled in accordance with that of a member whose deflection is to be measured, an electrical telemetric device, a pivotal member for controlling said telemetric device, said pivotal member having a vertical arm extending generally in the direction of motion of said crosshead, a member having an inclined surface connected to said crosshead for vertical movement therewith, and a lateral arm extending from said vertical arm across the path of vertical movement of said inclined surface member for engagement therewith whereby movement of the crosshead is transmitted to said telemetric device in an amount determined by the slope of said incline.

2. A deflectometer comprising, in combination, a movable crosshead adapted to be engaged by and have its movement controlled in accordance with that of a member whose deflection is to be measured, a motion responsive device, a bell crank for controlling said responsive device, said bell crank having one arm extending transversely of the direction of crosshead movement and engageable with the crosshead for transmitting a given amount of motion of the crosshead to said responsive device, a member having an inclined surface connectable to said crosshead for movement therewith, another arm of the bell crank extending across the path of movement of said inclined surfaced member for engagement therewith whereby movement of the crosshead is transmitted to said responsive device in an amount determined by the slope of said incline, and said first mentioned arm also being a counterbalance for the bell crank so as to bias the same in a direction to cause said arms to effect their respective engagements with the crosshead and inclined surface.

3. The combination set forth in claim 1 further characterized in that said inclined surface member is a conical shaped member and means are provided for rotatably supporting said conical member by said crosshead.

LAWRENCE K. HYDE.

REFERENCES CITED

The following references are of record in the file of this patent:

UNITED STATES PATENTS

| Number | Name | Date |
|---|---|---|
| 1,318,934 | Thompson | Oct. 14, 1919 |
| 1,422,161 | Woodrow | July 11, 1922 |
| 1,695,453 | Carpenter | Dec. 18, 1928 |
| 2,091,534 | Templin | Aug. 31, 1937 |
| 2,170,747 | Dimond | Aug. 22, 1939 |
| 2,184,036 | Buccicone et al. | Dec. 19, 1939 |